US 6,556,040 B2

(12) United States Patent
Whitworth (10) Patent No.: US 6,556,040 B2
(45) Date of Patent: Apr. 29, 2003

(54) METHOD AND APPARATUS FOR NON-LINEAR TERMINATION OF A TRANSMISSION LINE

(75) Inventor: Adam J. Whitworth, Sunnyvale, CA (US)

(73) Assignee: California Micro Devices, Milpitas, CA (US)

( * ) Notice: Subject to any disclaimer, the term of this patent is extended or adjusted under 35 U.S.C. 154(b) by 0 days.

(21) Appl. No.: 10/210,771

(22) Filed: Jul. 31, 2002

(65) Prior Publication Data

US 2002/0190747 A1 Dec. 19, 2002

Related U.S. Application Data

(63) Continuation of application No. 09/710,009, filed on Nov. 20, 2000, now abandoned.

(51) Int. Cl.[7] .............................................. H03K 17/16
(52) U.S. Cl. ............................ 326/30; 326/31; 326/34; 326/82; 326/83; 326/86
(58) Field of Search ........................... 326/30, 31, 34, 326/82, 83, 86

(56) References Cited

U.S. PATENT DOCUMENTS

| | | | | |
|---|---|---|---|---|
| 5,760,601 A | * | 6/1998 | Frankeny | 326/30 |
| 6,008,665 A | * | 12/1999 | Kalb et al. | 326/30 |
| 6,323,675 B1 | * | 11/2001 | Whitworth et al. | 326/30 |
| 6,323,676 B1 | * | 11/2001 | Whitworth et al. | 326/30 |
| 6,326,804 B1 | * | 12/2001 | Whitworth et al. | 326/30 |
| 6,326,805 B1 | * | 12/2001 | Whitworth et al. | 326/30 |
| 6,331,786 B1 | * | 12/2001 | Whitworth et al. | 326/30 |
| 6,331,787 B1 | * | 12/2001 | Whitworth et al. | 326/30 |

* cited by examiner

Primary Examiner—Michael Tokar
Assistant Examiner—Khai Nguyen
(74) Attorney, Agent, or Firm—Pillsbury Winthrop LLP (57) ABSTRACT

An active termination circuit for clamping a signal on a transmission line in an electronic device is described. The active termination circuit is configured to clamp the signal on the transmission line to one of a first reference voltage level and a second reference voltage level. In one embodiment, the active termination circuit includes a bottom clamping transistor coupled to a first potential having a bottom clamping transistor control node arranged for clamping the signal at about a first reference voltage. The active termination circuit also includes a top clamping transistor coupled to a second potential having a top clamping transistor control node arranged for clamping the signal at about a second reference voltage as well as an inverter unit coupling the transmission line to stabilizing capacitors for stabilizing control node voltages.

22 Claims, 6 Drawing Sheets

METHOD AND APPARATUS FOR NON-LINEAR TERMINATION OF A TRANSMISSION LINE

CROSS REFERENCE TO RELATED APPLICATIONS

This application a continuation of U.S. patent application Ser. No. 09/710,009, filed on Nov. 20, 2000 now abandoned, from which priority under 35 U.S.C. §120 is claimed, and the entire specification of which is incorporated herein by reference.

BACKGROUND OF THE INVENTION

1. Field of the Invention

The present invention relates to termination circuits and methods therefor. More particularly, the present invention relates to termination circuits that provide fast and efficient clamping for signals transmitted via transmission lines in electronic systems.

2. Description of Relevant Art

In the design and implementation of electronic systems (such as digital computers, consumer/commercial electronic devices, or the like), particularly those employing integrated circuits, undesired transmission line effects are of a particular concern. As signals travel down transmission lines, e.g., traces on a printed circuit board, reflections may occur on the lines. The reflections are due to, for example, mismatched impedances between the receiver circuit and the line, which may cause the signal to reflect back and forth, giving rise to ringing. These reflections and other undesired transmission lines effect are exacerbated as the operating speed of the signal increases. If left uncorrected, the reflections may cause the signal's voltage to swing outside of the defined "0" or "1" voltage levels, thereby causing the receiving device to incorrectly interpret the signal received and generate erroneous results.

Figure 1:
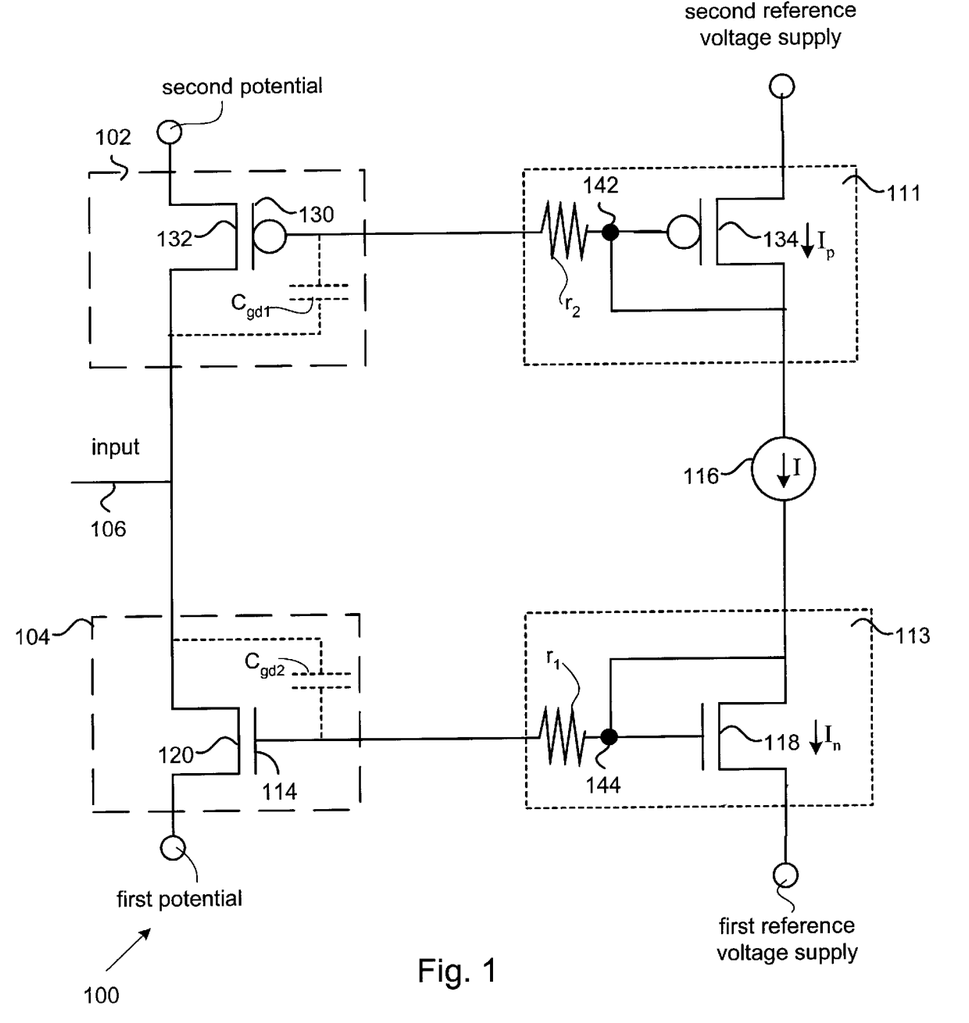
FIG. 1 illustrates a conventional termination circuit.

To address this problem, a variety of techniques have been tried in the prior art. One such technique is shown in FIG. 1 illustrating a termination circuit 100 includes a top active clamping device 102 and a bottom active clamping device 104. In the circuit 100, the top active clamping device 102 is implemented by a p-channel MOS device 132 and serves to clamp the signal on a transmission line 106 at about a second reference voltage (e.g., $V_{DD}$). On the other hand, bottom active clamping device 104 is implemented by an n-channel MOS device 120 and serves to clamp the signal on transmission line 106 at a first reference voltage(e.g., ground or GND). In accordance with the convention utilized herein, the top devices are employed to clamp the voltage level of the signal on the transmission line at its upper range (e.g., to about $V_{DD}$), while the bottom devices are employed to clamp the voltage level of the signal at its lower range (e.g., to about ground).

The source of MOS device 132 can be coupled to $V_{DD}$ while the source of MOS device 120 can be coupled to ground. The drains of devices 132 and 120 are both coupled to transmission line 106 as shown. Referring now to bottom active clamping device 104, a gate 114 of MOS device 120 is coupled to both the gate and drain of a bottom threshold reference device 113 having an input impedance $r_1$. As shown in FIG. 1, bottom threshold reference device 113 includes an n-channel MOS device 118, which is arranged in a gate-to-drain connected configuration.

When sufficient current flows into the drain of n-channel MOS device 118 (the current may be sourced from any conventional current sourcing arrangement, which is shown symbolically by current source 116 in FIG. 1), gate 114 of bottom active clamping device 104 is biased at about one threshold voltage $V_T$ of n-channel MOS device 118 above ground. Typically, the voltage at gate 114 is biased at the threshold voltage $V_T$ of n-channel MOS device 118 plus a small amount of overdrive voltage necessary to sustain the current through device 118.

When the signal on transmission line 106 begins to reflect and dips below ground, i.e., as soon as the potential difference between the gate of n-channel MOS device 120 of bottom active clamping device 104 and its source exceeds $V_T$, n-channel device 120 begins to conduct to source current from its drain, which is connected to ground as shown in FIG. 1. Accordingly, the signal is clamped at about or slightly below ground. As noted, gate 114 of n-channel device 120 is typically biased slightly above VT. Consequently, it is typically the case that n-channel device 120 begins to conduct when the signal on transmission line 106 is slightly above ground (e.g., perhaps 0.1 V above ground). In this manner, n-channel device 120 would be in full conduction when the signal on transmission line 106 dips below ground.

A similar arrangement exists with reference to gate 130 of the p-channel MOS device 132 of top active clamping device 102 in that the gate 130 of MOS device 132 is coupled to both the gate and drain of a top threshold reference device 111 having an input impedance $r_2$. More particularly, the gate 130 is coupled to the gate and drain of p-channel MOS device 134. The source of p-channel MOS device 130 is coupled to $V_{DD}$ as shown. When sufficient current flows out of the drain of p-channel device 134, gate 130 of p-channel device 132 is biased at about $V_{DD}-V_T$, where $V_T$ is the threshold voltage of p-channel MOS device 134. Actually, gate 130 of p-channel device 132 is biased slightly below this value ($V_{DD}-V_T$) due to the presence of the overdrive voltage necessary to sustain current through p-channel MOS device 134.

When the signal on transmission line 106 begins to reflect and rises above $V_{DD}$, p-channel MOS device 132 turns on to clamp this signal at about $V_{DD}$. Due to the presence of the aforementioned overdrive voltage, p-channel MOS device 132 typically turns on slightly before the voltage level of the signal on transmission line 106 reaches $V_{DD}$, thereby ensuring that p-channel MOS device 132 is fully turned on when the signal's voltage level exceeds $V_{DD}$.

Figure 2:
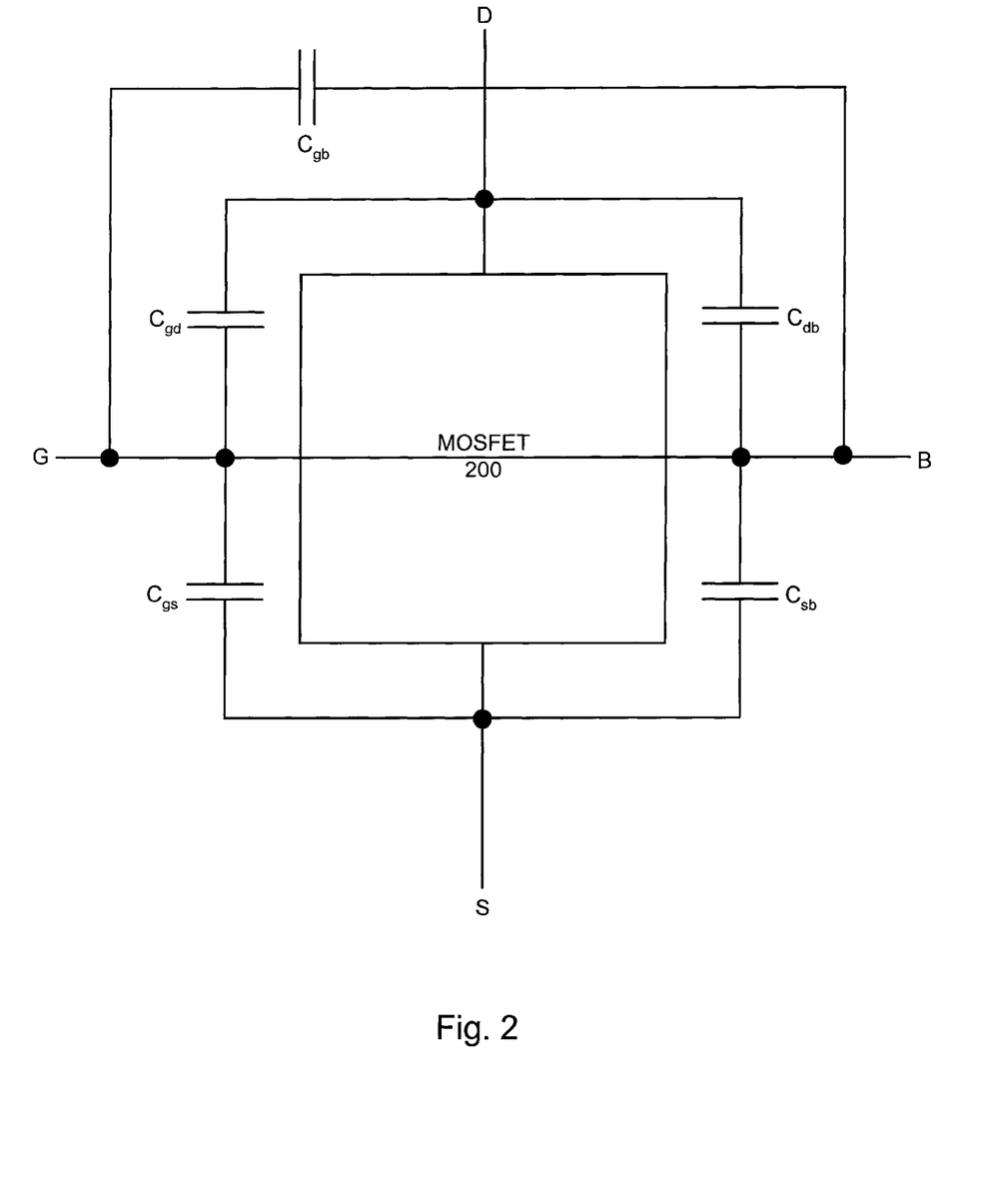
FIG. 2 illustrates a typical MOSFET having associated junction parasitic capacitances represented as lumped elements between the device terminals.

As well known in the art, all junction type devices (including transistors) have intrinsic capacitance loading between the various junctions commonly referred to as parasitic capacitance. One such parasitic component particularly relevant to the inventive termination circuit are referred to as MOSFET capacitances. These parasitic components are mainly responsible for the intrinsic delay of logic gates. FIG. 2 illustrates a typical MOSFET 200 having associated junction parasitic capacitances represented as lumped elements between the device terminals. Based on their physical origins, the parasitic device capacitances can be classified into two major groups: (1) oxide-related capacitances and (2) junction capacitances. In the example shown, the gate-oxide-related capacitances are Cgd (gate-to-drain capacitance), Cgs (gate-to-source capacitance), and Cgb (gate-to-substrate capacitance). It is well known in the art that the gate-to-channel capacitance is distributed and voltage dependent, and consequently, all of the oxide-related capacitances described here changes with the bias conditions of the transistor. Note that the total gate oxide capacitance is mainly determined by the parallel-plate capacitance between the gate and the underlying structures. Hence, the magnitude of the oxide-related capacitances is very closely related to (1) the gate oxide thickness, and (2) the area of the MOSFET gate.

Referring back to FIG. 1, the gate to drain parasitic capacitance $C_{gd1}$ (associated with transistor 132) and $C_{gd2}$ (associated with transistor 120) degrade the clamping performance of the termination circuit 100 by causing the gate voltages of the clamping transistors 132 and 120 to vary in relation to the input voltage rise or fall on the transmission line 106. In some cases, this variation in gate voltage can be hundreds of millivolts.

In addition to the presence of the parasitic capacitances $C_{gd1}$ and $C_{gd2}$ that degrade the clamping performance of the termination circuit 100, DC power in excess of that required by the current source 116 is dissipated due to what is referred to as the short channel effect. Currents $I_p$ and $I_n$ are always flowing in the bias voltage generator circuits 111 and 113, respectively. However currents that may be an order of magnitude greater than bias currents $I_p$ and $I_n$ can flow in the clamping transistors when there exists both a voltage between the source and drain of greater than a threshold voltage, and also a voltage between the source and gate of approximately a threshold voltage (or more). These short channel effect currents are present whether or not that particular FET is required at a particular point in the operation of the circuit 100. For example, even though it is only the transistor 120 that is needed to clamp the transmission line 106 to ground, the transistor 132 is generating short channel current which is many times greater than $I_p$, adding unnecessarily to the DC power dissipation of the termination circuit 100.

In view of the foregoing, there are desired improved termination circuits and methods therefor that advantageously provide fast and efficient clamping for signals transmitted via transmission lines in electronic systems, particularly signals having low operating voltage ranges.

SUMMARY OF THE INVENTION

The present invention describes, in one embodiment, to an active termination circuit for clamping a signal on a transmission line in an electronic device. The active termination circuit includes a bottom clamping transistor coupled to a first potential having a bottom clamping transistor control node arranged for clamping the signal at about a first reference voltage, and a bottom threshold reference transistor coupled to a first reference voltage supply configured to supply the first reference voltage. The first threshold reference transistor provides a first bias voltage to the bottom clamping transistor control node that biases the bottom clamping transistor control node at about a first threshold voltage above the first reference voltage. The first threshold voltage represents a threshold voltage of the first clamping transistor. The active termination circuit also includes a top clamping transistor coupled to a second potential having a top clamping transistor control node arranged for clamping the signal at about a second reference voltage and a top threshold reference transistor coupled to a second reference voltage supply configured to supply the second reference voltage. The top threshold reference transistor provides a second bias voltage to the top clamping transistor control node that biases the top clamping transistor control node at about a second threshold voltage below the second reference voltage. The second threshold voltage represents a top clamping transistor threshold voltage reference voltage. The active circuit further includes an inverter unit having an inverter unit input node coupled to the transmission line and an inverter unit output node, a first stabilizing capacitor coupled between the bottom clamping transistor control node and the inverter unit output node, and a second stabilizing capacitor coupled between the top clamping transistor control node and the inverter unit output node.

In another embodiment, a method of clamping a signal on a transmission line to one of a first and a second reference voltage using the active clamping circuit is described.

In yet another embodiment, the stabilizing capacitors are respectively replaced by resistors In yet another embodiment, the stabilizing capacitors are each coupled to an associated resistor.

In still another embodiment, the resistors are incorporated into the inverter unit.

These and other advantages of the present invention will become apparent upon reading the following detailed descriptions and studying the various drawings.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In the described embodiment, the inventive active termination circuit includes a bottom clamping transistor having a bottom clamping transistor first node coupled to a transmission line at a transmission line input node, a bottom clamping transistor second node coupled to a first potential, and a bottom clamping transistor control node coupled to a first bias voltage supply. The circuit also includes a top clamping transistor having a first top clamping transistor node coupled to the transmission line at the transmission line input node, a second top clamping transistor node coupled to a second potential, and a top clamping transistor control node coupled to a second bias voltage supply. The circuit further includes an inverter unit having an inverter unit input node coupled to the transmission line input node and an inverter unit output node coupled to the bottom clamping transistor control node by way of a first stabilizing capacitor. The inverter unit output node is also coupled to the top clamping transistor control node by way of a second stabilizing capacitor.

In this way, when a logic transition event occurs on the transmission line, the inverter unit provides an anti-phase signal to both the first and second stabilizing capacitors. This anti-phase signal substantially eliminates any rise or fall of the gate voltages by providing a current path through either the first or the second stabilizing capacitors appropriate for the particular logic transition event.

The invention will now be described in terms of an active termination circuit having MOS type transistors. It should be noted, however, that any appropriate transistor technology can be used that is deemed suitable for the application at hand. For the remainder of this discussion only, therefore, the bottom and top clamping transistors are assumed to be MOS type transistors and the second potential is and the first potential are assumed to be VDD and GND, respectively. It should be noted, however, that these assumptions are for the sake of this discussion only and should not be construed as limiting either the scope or intent of the invention. For example, the first and the second potentials can be any appropriate values as can be the first and the second reference voltage supplies.

Figure 3:
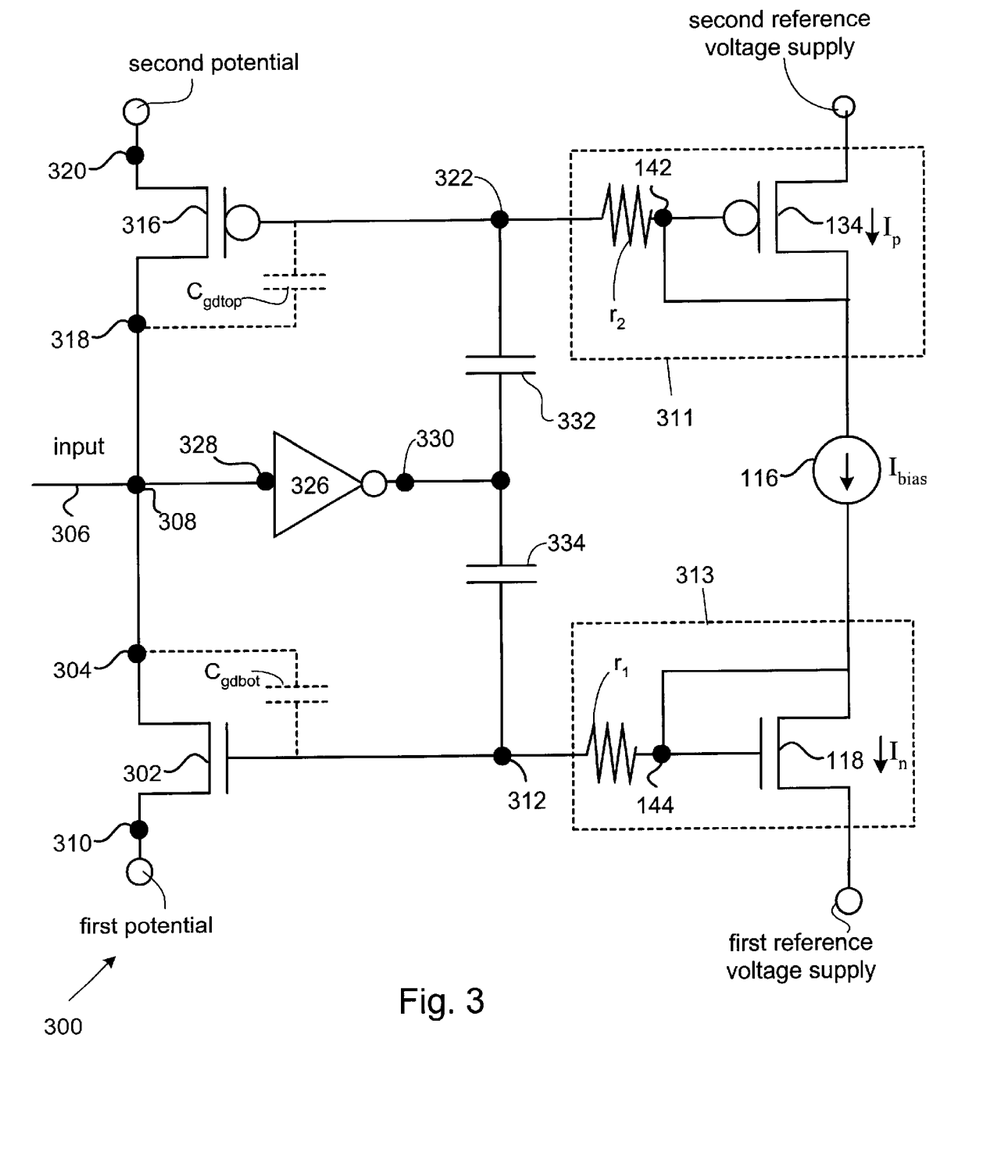
FIG. 3 illustrates, in accordance with one embodiment of the present invention, a CMOS implementation of the inventive active termination circuit.

With this in mind, FIG. 3 illustrates a termination circuit 300 in accordance with an embodiment of the invention. In the described embodiment, the termination circuit 300 includes a bottom clamping transistor 302 (with a gate to drain parasitic capacitance $C_{gdbot}$) having a bottom clamping transistor first node 304 coupled to a transmission line 306 at a transmission line input node 308, a bottom clamping transistor second node 310 coupled to a first potential, and a bottom clamping transistor control node 312 coupled to a first bias voltage supply 313 (having an output impedance $r_1$) which in turn is coupled to a first reference voltage supply. The circuit 300 also includes a top clamping transistor 316 (with a gate to drain parasitic capacitance $C_{gdtop}$) having a first top clamping transistor node 318 coupled to the transmission line 306 at the transmission line input node 308, a second top clamping transistor node 320 coupled to a second potential, and a top clamping transistor control node 322 coupled to a second bias voltage supply 311 (having an output impedance $r_2$) which in turn is coupled to a second reference voltage supply. The circuit further includes an inverter unit 326 having an inverter unit input node 328 coupled to the transmission line input node 308 and an inverter unit output node 330 coupled to the top clamping transistor control node 322 by way of a first stabilizing capacitor 332. The inverter unit output node 330 is also coupled to the bottom clamping transistor control node 312 by way of a second stabilizing capacitor 334.

In this way, when a logic transition event occurs on the transmission line 306, the inverter unit 326 provides an anti-phase signal to both the first and second stabilizing capacitors 332 and 334 at the output node 330. This anti-phase signal substantially eliminates any rise or fall of the gate voltages at either 322 or 312 by providing a current path through either the first or the second stabilizing capacitors 332 or 334 appropriate for the particular logic transition event.

During a high going type input transition event, for example, when a signal $S_1$ on transmission line 306 begins to transition from a LOW signal, or logic 0 (approximately GND) to a logic 1 (approximately VDD), the inverter unit 326 provides an anti-phase signal/$S_1$ at the inverter unit output node 330, which in this case would be a transition from a logic 1 to a logic 0. This anti-phase signal/$S_1$, in turn, biases the stabilizing capacitor 332 in relation to gate node 322 so as to reduce any voltage increase at the gate node 322. More particularly, as described above, during this high going type logic transition, the parasitic capacitance $C_{gdtop}$ tends to make the voltage at node 322 rise thereby increasing the clamping voltage of the top clamping transistor 316. If left uncompensated (as in conventional clamping circuits), this increase in clamping voltage degrades the effectiveness of the termination circuit, however, the anti-phase single/$S_1$ provided by the inverter unit 326 provides a current path through the stabilizing capacitor 332 that tends to reduce the voltage at node 322 thereby compensating for the effects of the parasitic capacitance $C_{gdtop}$. By making the capacitance of 332 substantially equal to the parasitic capacitance $C_{gdtop}$, the voltage at node 322 remains substantially constant through the high going input transition event. This rationale also applies to those situations where a low going type input transition event when a signal $S_2$ on transmission line 306 begins to transition from a HIGH signal, or logic 1 (approximately VDD) to a logic 0 (approximately GND). The anti-phase signal/$S_2$ (i.e., VDD at node 330) provides a current path to the node 312 by way of the capacitor 334 thereby raising the voltage at node 312 compensating for the effects of the parasitic capacitance $C_{gdbot}$.

Figure 4:
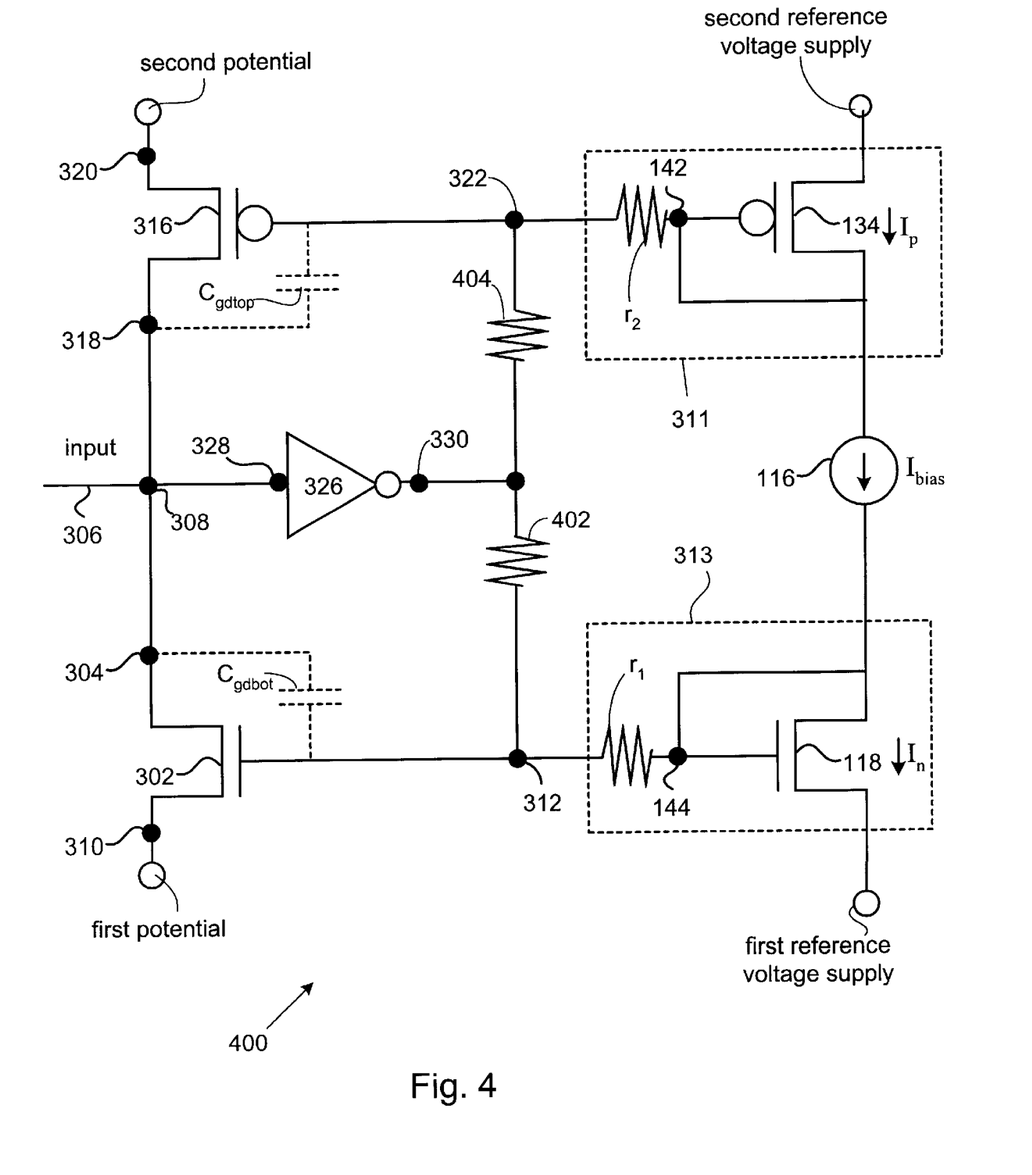
FIG. 4 illustrates a termination circuit where both DC power is reduced and the clamping voltage is improved in accordance with an embodiment of the invention.

To compensate for the effects of $C_{gdbot}$ and $C_{gdtop}$ capacitor 334 should be approximately equal to $C_{gdbot}$ and capacitor 332 approximately equal to $C_{gdtop}$ An interesting effect occurs if capacitor 334 is greater than $C_{gdbot}$ and capacitor 332 is greater than $C_{gdtop}$. In this case, when the signal $S_1$ on transmission line 306 begins to transition from a LOW signal, or logic 0 (approximately GND) to a logic 1 (approximately VDD), the voltage at node 322 will actually drop for a short time, decreasing the clamping voltage and improving the effectiveness of the circuit. The short time during which the voltage at node 322 drops is governed by the values of capacitors 332, $C_{gdtop}$ and resistor $r_2$ FIG. 4 illustrates a termination circuit 400 where both DC power is reduced and the clamping voltage is improved in accordance with an embodiment of the invention. It should be noted that the circuit 400 is one implementation of the termination circuit 300 and will thus be described using the aforementioned components appropriate for both circuits 300 and 400. In the described embodiment of the circuit 400, the inverter unit output node 330 is coupled to the bottom clamping transistor control node 312 by way of a first resistor 402 and to the top clamping transistor control node 322 by way of a second resistor 404. It should be noted that the resistors $r_1$ and $r_2$ can be representative of the output impedances of the bias voltage supplies 313 and 311, respectively, or they can be separate, discreet resistors. In the described embodiment, the first and second resistors 402 and 404 can be fabricated from a FET or from a diffused poly, or thin film resistor. It should also be noted that the resistance values of $r_1$ and $r_2$ are typically much less than those for either the first and second resistors 402 and 404, respectively.

During operation, when, for example, an input signal $S_3$ is at a logic 0, the output of the inverter unit 326 is a logic 1 (i.e., VDD) and the voltage divider created by the $r_1$ and the first resistor 402 causes the voltage at node 312 to be greater than the voltage at a node 144. This is advantageous when the input signal $S_3$ is at a logic 0 because now if the voltage at input node 308 moves below GND, the bottom clamping transistor 302 will turn on sooner and the clamping voltage will be commensurably reduced. In this way, the bias current $I_{bias}$ provided by the current source 116 can be substantially reduced by as much as two orders of magnitude over conventionally configured termination circuits. This reduction in the bias current $I_{bias}$ is realized due to the novel configuration of the inventive clamping circuit 400 since the voltage at node 322 can be increased (i.e., since the top clamping transistor 316 is not needed when the input signal $S_3$ is at logic 0) while at the same time the voltage at node 312 is increased (providing enhanced clamping).

For those situations where the second potential is VDD, the circuit 400 also reduces the DC current in the transistors 302 and 316. For example, when the input node 308 is at a logic 0, there will be current flowing from VDD through transistor 316 to node 308. This current will be greater than the bias current $I_{bias}$ due to the short channel effect discussed above. Since the inverter unit 326 inverts the input signal, the output node 330 will be at a logic 1 and the voltage divider created by the resistors r2 and 404 will cause the voltage at node 322 to be greater than the voltage at 142. This will further turn off transistor 316 and thereby commensurably reduce the DC current flow through the transistor 316.

Figure 5:
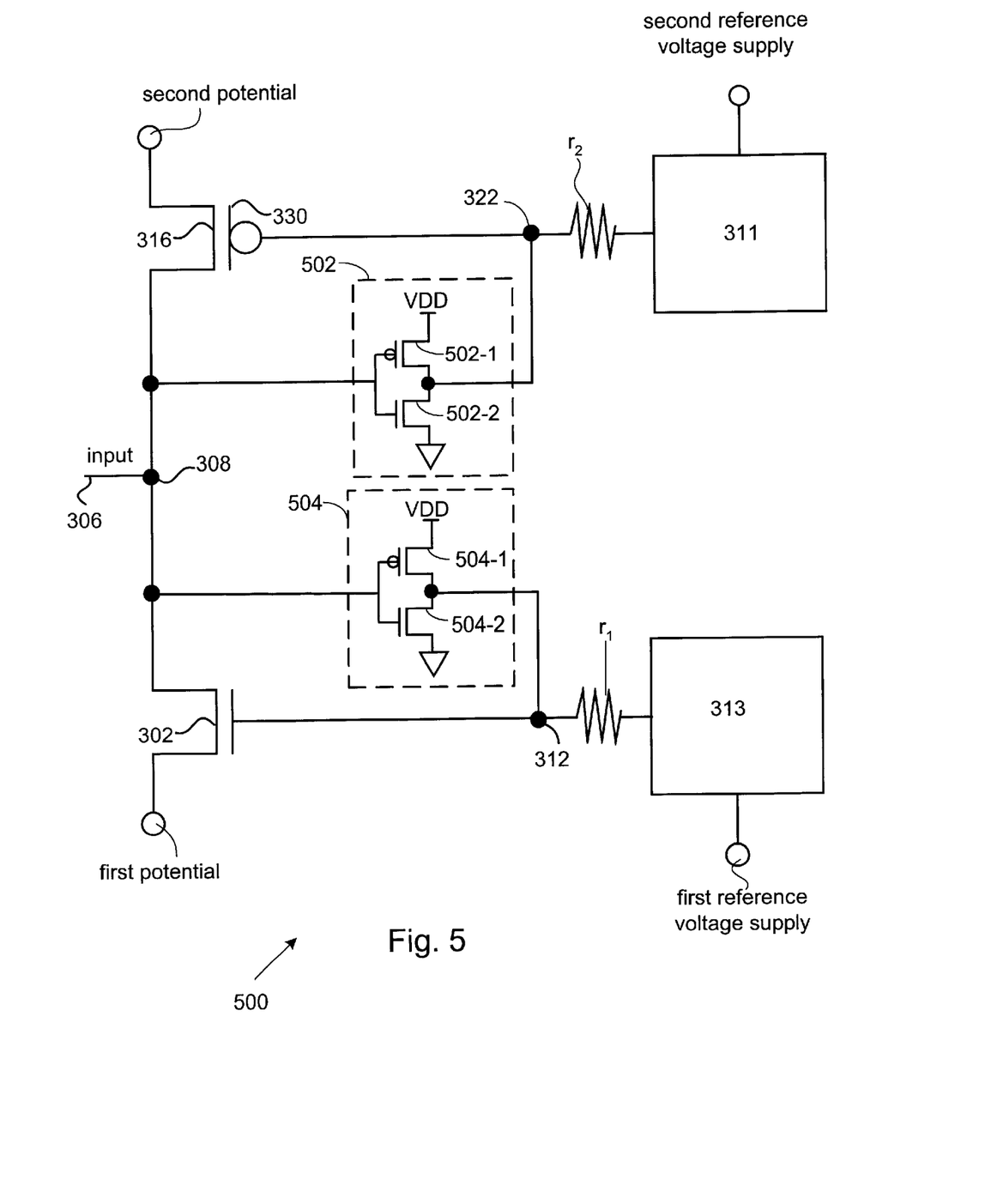
FIG. 5 shows a termination circuit having voltage divider resistors integrated as part of an inverter unit in accordance with an embodiment of the invention.

FIG. 5 shows a termination circuit 500 having voltage divider resistors integrated as part of an inverter unit in accordance with an embodiment of the invention. In the circuit 500, a first inverter 502 having transistors 502-1 and 502-2 and a second inverter 504 having transistors 504-1 and 504-2 are used. In the embodiment shown, the transistors 502-1 and 504-2 further turn off the clamping transistors 316 and 302 when not needed. Transistors 504-1 and 502-2 further turn on the clamping transistors 302 and 316 when they are needed. Those of ordinary skill in the art can see that the on-resistances of transistors 502-1, 502-2, 504-1 and 504-2 can be independently optimized for a particular application. One or more of the transistors 502-1, 502-2, 504-1 and 504-2 can even be omitted while still retaining some of the advantages of this circuit.

Additionally, by selectively increasing the gate voltages on the various transistors, the clamping transistors can be made smaller, reducing thereby the cost and the capacitance of the input node and still maintain good clamping characteristics.

Figure 6:
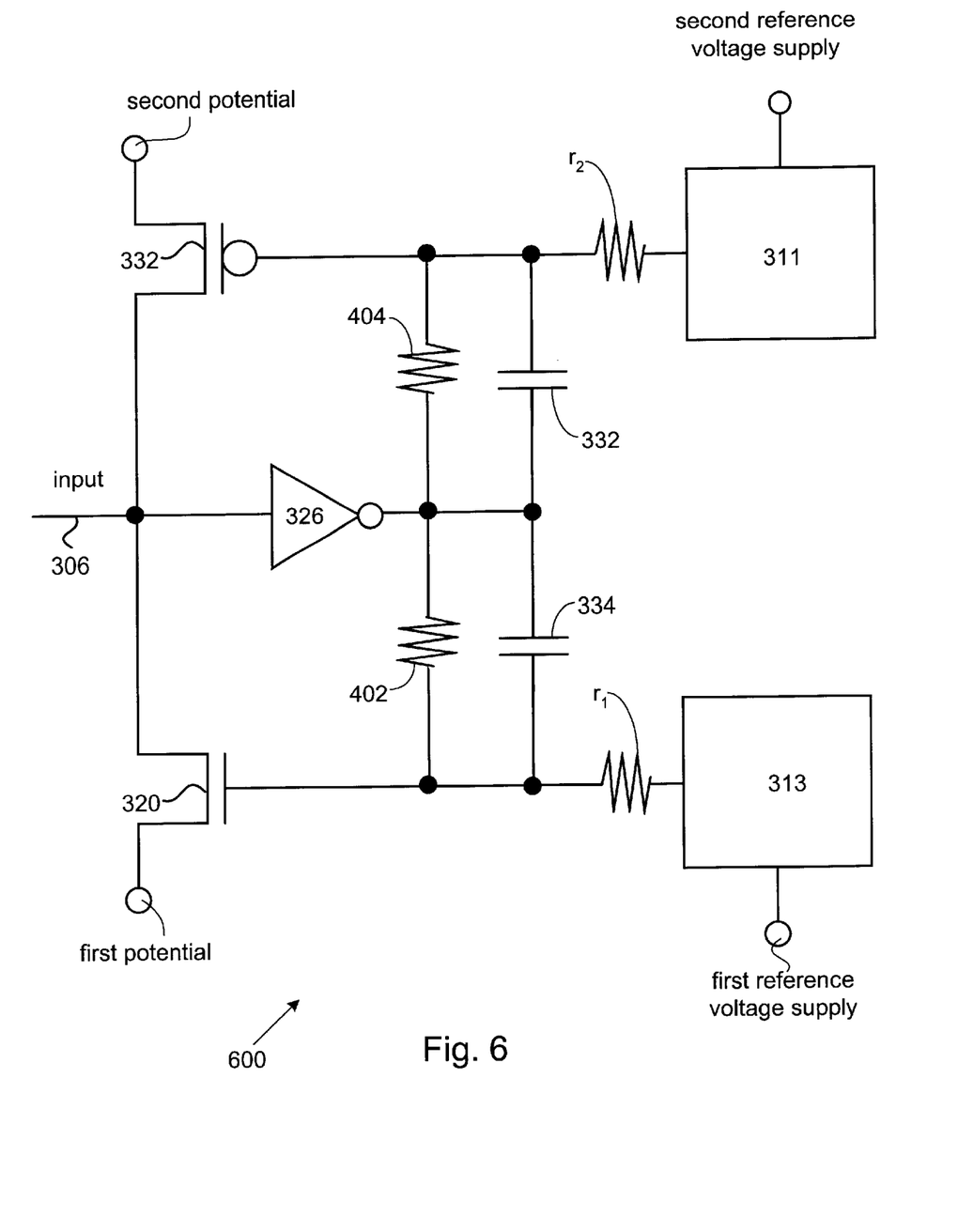
FIG. 6 shows another embodiment of the clamping circuit shown in FIG. 3.

FIG. 6 shows a termination circuit 600 as another embodiment of the clamping circuit 300. A circuit such as this both compensates for $C_{gdbot}$ and $C_{gdtop}$ and also reduces the DC power loss due to the short channel effect.

It should be noted that in general in those situations where a number of associated transmission lines that taken together form, for example, a bus (i.e., data, address, or memory), a plurality of the above described termination circuits can each be used to terminate a signal associated with a particular one of the transmission lines. Such an arrangement is useful in termination signals from memory busses, address busses, data busses, and the like.

While this invention has been described in terms of several preferred embodiments, there are alterations, permutations, and equivalents that fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An active termination circuit for terminating a signal traversing on a transmission line of an electronic device, comprising:

a bottom clamping transistor coupled to a first potential having a bottom clamping transistor control node arranged for clamping said signal at about a first reference voltage;

a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;

a top clamping transistor coupled to a second potential having a top clamping transistor control node arranged for clamping said signal at about a second reference voltage;

a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;

an inverter unit having an inverter unit input node coupled to the transmission line and an inverter unit output node;

a first stabilizing capacitor coupled between said bottom clamping transistor control node and the inverter unit output node; and a second stabilizing capacitor coupled between said top clamping transistor control node and the inverter unit output node.

2. A circuit as recited in claim 1, wherein the first potential and the second potential are each VDD.

3. A circuit as recited in claim 1, wherein the first potential and the second potential are each GND.

4. A circuit as recited in claim 1, wherein the first potential is VDD and wherein the second potential is GND.

5. A circuit as recited in claim 1, wherein the first potential is GND and wherein the second potential is VDD.

6. A circuit as recited in claim 1 wherein said bottom clamping transistor, said top clamping transistor, said bottom threshold reference transistor, and said top threshold reference transistor are fabricated using MOS technology.

7. An active termination circuit for terminating a signal traversing on a transmission line of an electronic device, comprising:

a bottom clamping transistor coupled to a first potential having a bottom clamping transistor control node arranged for clamping said signal at about a first reference voltage;

a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;

a top clamping transistor coupled to a second potential having a top clamping transistor control node arranged for clamping said signal at about a second reference voltage;

a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;
an inverter unit having an inverter unit input node coupled to the transmission line and an inverter unit output node;
a first resistor coupled between said bottom clamping transistor control node and the inverter unit output node; and
a second resistor coupled between said top clamping transistor control node and the inverter unit output node.

8. A circuit as recited in claim 7, the first potential and the second potential are each approximately VDD.

9. A circuit as recited in claim 7, wherein the first potential and the second potential are each approximately GND.

10. A circuit as recited in claim 7, wherein the first potential is VDD and wherein the second potential is approximately GND.

11. A circuit as recited in claim 7, wherein the first potential is GND and wherein the second potential is approximately VDD.

12. An active termination circuit for terminating a signal traversing on a transmission line of an electronic device, comprising:
a bottom clamping transistor coupled to a first potential having a bottom clamping transistor control node arranged for clamping said signal at about a first reference voltage;
a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;
a top clamping transistor coupled to a second potential having a top clamping transistor control node arranged for clamping said signal at about a second reference voltage;
a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;
a first inverter unit having a first inverter unit impedance and a first inverter unit input connected to the transmission line and a first inverter unit output connected to the bottom clamping transistor control gate node; and
a second inverter unit having a second inverter unit impedance and a second inverter unit input connected to the transmission line and a second inverter unit output connected to the top clamping transistor control gate node, wherein the first inverter unit impedance and the second inverter unit impedance form a voltage divider circuit.

13. A circuit as recited in claim 12, wherein the first potential and the second potential are each approximately VDD.

14. A circuit as recited in claim 12, wherein the first potential and the second potential are each approximately GND.

15. A circuit as recited in claim 12, wherein the first potential is VDD and wherein the second potential is approximately GND.

16. A circuit as recited in claim 12, wherein the first potential is GND and wherein the second potential is approximately VDD.

17. An active termination circuit for terminating a signal traversing on a transmission line of an electronic device, comprising:
a bottom clamping transistor coupled to a first potential having a bottom clamping transistor control node arranged for clamping said signal at about a first reference voltage;
a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;
a top clamping transistor coupled to a second potential having a top clamping transistor control node arranged for clamping said signal at about a second reference voltage;
a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;
an inverter unit having an inverter unit input node coupled to the transmission line and an inverter unit output node;
a first capacitor coupled between said bottom clamping transistor control node and the inverter unit output node; and
a second capacitor coupled between said top clamping transistor control node and the inverter unit output node.

18. A circuit as recited in claim 17, wherein the first potential and the second potential are each approximately VDD.

19. A circuit as recited in claim 17, wherein the first potential and the second potential are each approximately GND.

20. A circuit as recited in claim 17, wherein the first potential is VDD and wherein the second potential is approximately GND.

21. A circuit as recited in claim 17, wherein the first potential is GND and wherein the second potential is approximately VDD.

22. A circuit as recited in claim 17, further comprising:
a first resistor coupled between said bottom clamping transistor control node and the inverter unit output node; and
a second resistor coupled between said top clamping transistor control node and the inverter unit output node.

* * * * *